United States Patent
Kohlndorfer et al.

[11] Patent Number: 6,036,274
[45] Date of Patent: Mar. 14, 2000

[54] DRIVE PULLEY, COMPACT BUCKLE PRETENSIONER

[75] Inventors: Kenneth H. Kohlndorfer, Roseville; Mark F. Gray, Sterling Heights, both of Mich.

[73] Assignee: Breed Automotive Technology, Inc., Lakeland, Fla.

[21] Appl. No.: 08/969,296

[22] Filed: Nov. 13, 1997

[51] Int. Cl.$^7$ ................................................. A47C 31/00
[52] U.S. Cl. ........................................... 297/480; 280/806
[58] Field of Search ................................. 280/806, 801.1; 297/470, 476–480

[56] References Cited

U.S. PATENT DOCUMENTS 3,439,932  4/1969  Lewis et al. .
4,932,722  6/1990  Motozawa .
5,207,618  5/1993  Nishizawa .
5,564,748  10/1996  Kmiec et al. .
5,676,397  10/1997  Bauer .
5,762,372  6/1998  Koujiya et al. .
5,788,025  8/1998  Nishide et al. .

FOREIGN PATENT DOCUMENTS 2226189  11/1974  France .

Primary Examiner—Milton Nelson, Jr.
Attorney, Agent, or Firm—Markell Seitzman

[57] ABSTRACT

A pretensioner (22) comprising: a housing (20) with a bore (26); a piston (50) slidably received within the bore (26), the piston further including a pulley surface (58, 60) at one end thereof; a flexible link (92) having a first end (94) fixedly connected to the housing (22), a medial portion slidably positioned about the pulley surface and an opposite end (93) adapted to be connected to a buckle (90); a pyrotechnic device (80) for propelling the piston from a first, static position to a second position to affect a mechanical advantage in the movement of the buckle (90).

18 Claims, 9 Drawing Sheets

DRIVE PULLEY, COMPACT BUCKLE PRETENSIONER

BACKGROUND AND SUMMARY OF THE INVENTION

The present invention generally relates to a component in a safety restraint system, and more particularly to a compact buckle pretensioner.

Buckle pretensioners, or belt tightening units, are typically used to remove slack about the occupant. These pretensioners typically utilize a housing having a movable piston. The piston is propelled down the housing by a pyrotechnic charge. The piston is coupled directly to the buckle so that for each unit of movement of the piston, the buckle is moved a similar distance.

It is an object of the present invention to provide an improved compact buckle pretensioner. A further object of the present invention is to provide such a pretensioner with a mechanical advantage, that is the ability to move the buckle a distance that is greater than the movement of the corresponding piston. Accordingly the invention comprises: a pretensioner comprising: a housing with a bore; a piston slidably received within the bore, the piston further including a pulley surface at one end thereof; a flexible link having a first end fixedly connected to the housing, a medial portion slidably positioned about the pulley surface and an opposite end adapted to be connected to a buckle; first means for propelling the piston from a first, static position to a second position to affect a mechanical advantage in the movement of the buckle.

Many other objects and purposes of the invention will be clear from the following detailed description of the drawings.

DETAILED DESCRIPTION OF THE DRAWINGS

Figure 1:
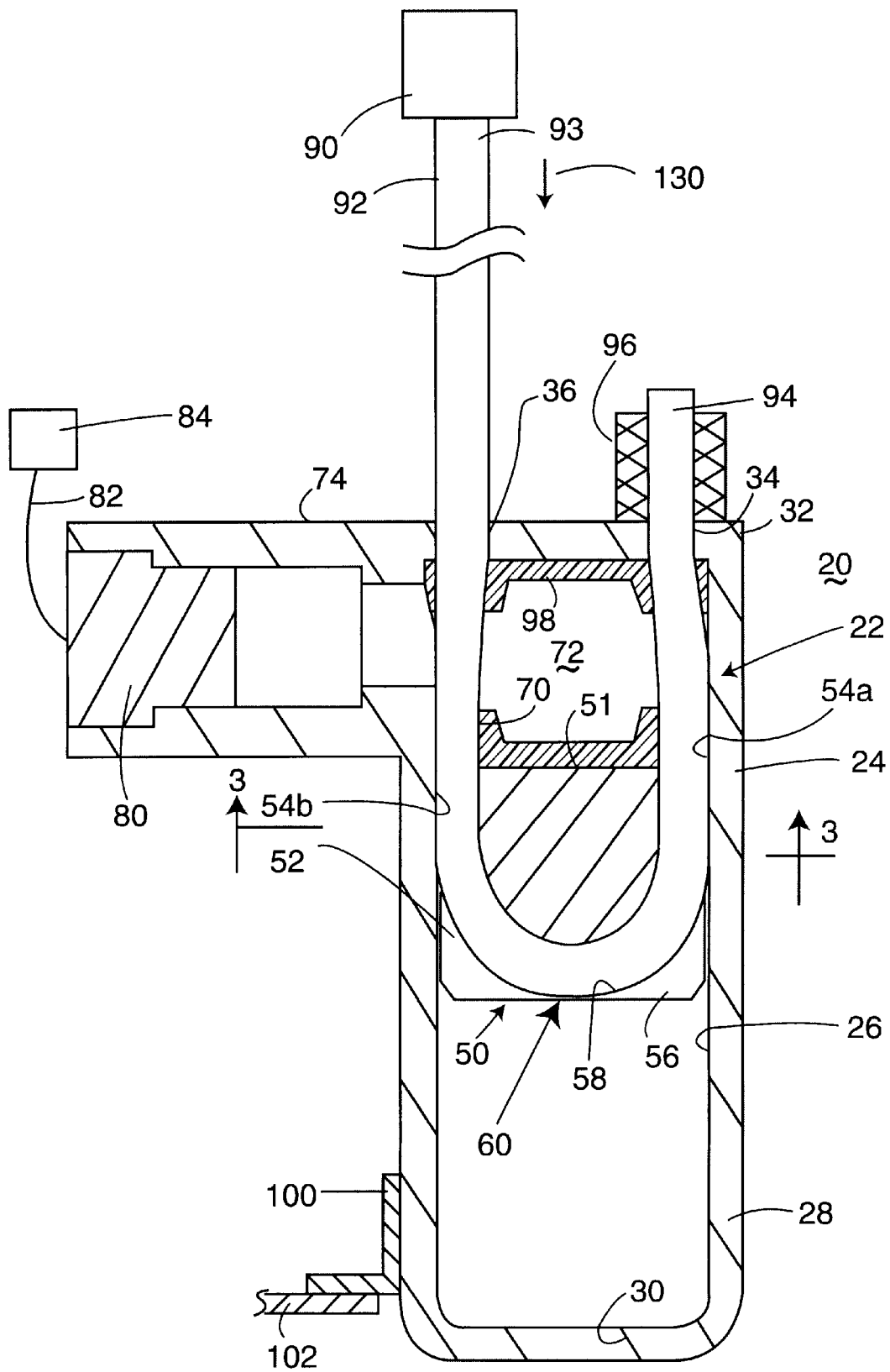
FIG. 1 is a cross sectional view of a compact buckle pretensioner.
Figure 2:
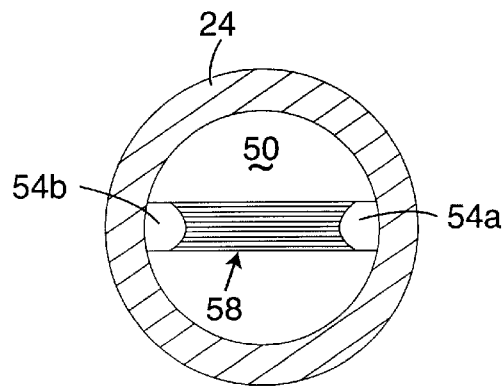
FIG. 2 illustrates an isolated end plan view of the piston within a housing.

Reference is made to FIG. 1 which illustrates a cross sectional view of a compact buckle pretensioner 20. The pretensioner includes a housing 22 having walls 24 defining a bore 26. The lower portion 28 of the bore includes a vent opening 30. The upper portion 32 of the housing includes a first opening 34 and a second opening 36. Positioned within the housing is a slidable piston 50. The piston 50 includes side walls 52 slidingly received within the bore 26. The piston 50 additionally includes first and second grooves or bores 54a and 54b (see FIG. 2). The lower end 56 of the piston includes an arcuate groove 58 which forms a pulley generally shown as 60. Situated about the piston 50, or integrated therein, is a seal 70 which prevents gasses from blowing or passing by the piston. The upper portion 72 of the bore 26 defines a gas chamber. The housing 22 may optionally include an extending portion 74 within which is received a pyrotechnic, gas generating device 80 of known construction. The device 80 includes one or more electric leads 82 which receive an activation signal from a controller 84. A buckle 90 is operatively connected to the pretensioner 20. As is known in the art, seat belt buckles 90 typically include a metal frame. The metal frame is modified, as is known in the art, to receive an end 93 of a flexible, Bowden cable 92. The cable is received through opening 36 and threaded through groove or bore 54b, then about the pulley 60 (groove 58), through groove 54a and out through opening 34. The extending end 94 of the cable 92 is anchored to the housing 22 by an appropriate connector or anchor 96. A seal 98 is provided at openings 34 and 36 to prevent gasses from exiting the openings 34 and 36. The housing 22 is appropriately secured via a bracket 100 to a structural portion of the vehicle or seat generally designated by numeral 102.

Figure 3:
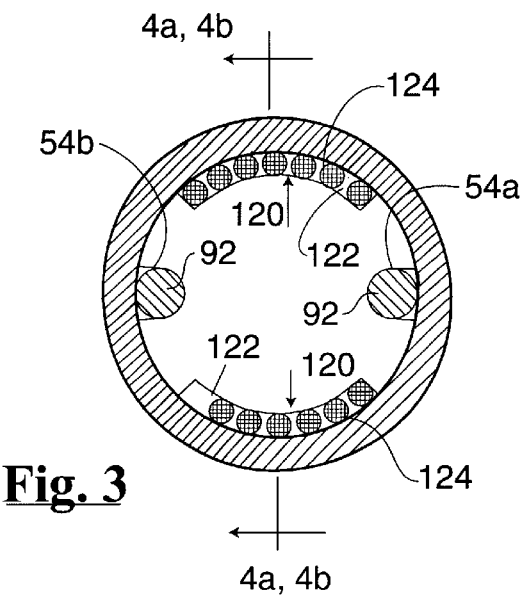
FIG. 3 is a cross sectional view through section lines 3—3 of FIG. 1.
Figure 4A:
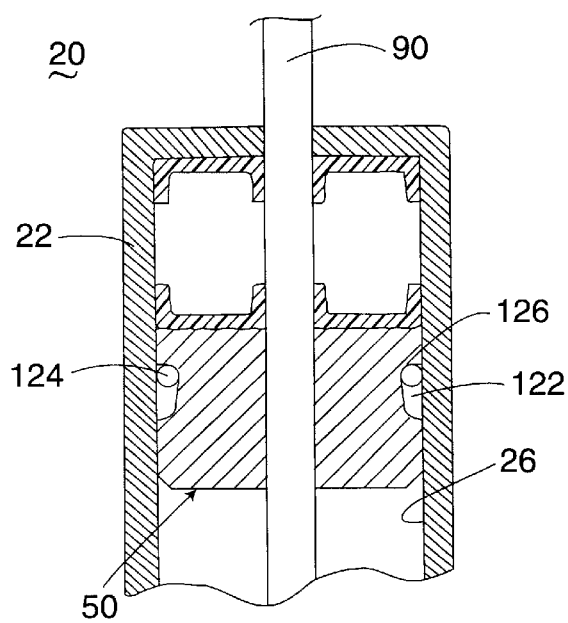
FIGS. 4a and 4b are partial cross sectional views showing the operation of a piston lock means.
Figure 4B:
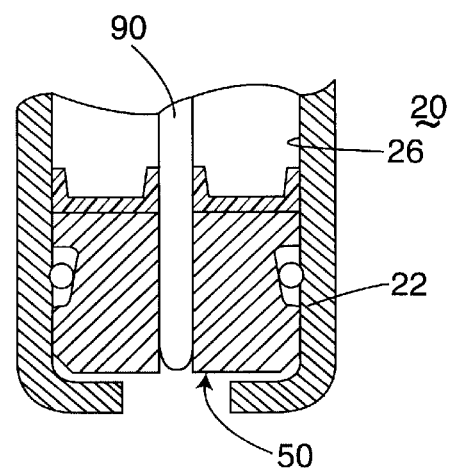
Figure 5:
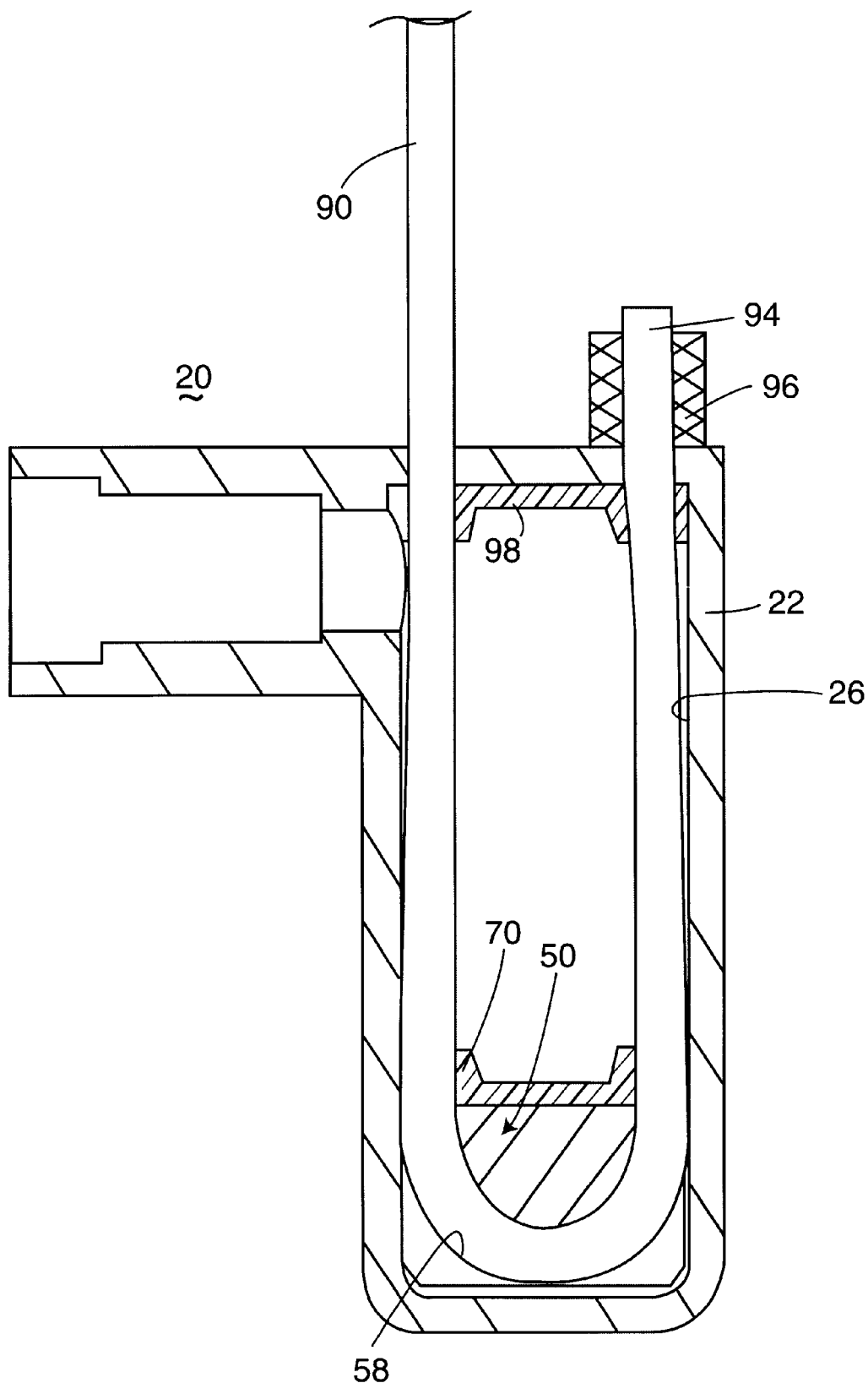
FIG. 5 shows the piston is its actuated position.

The piston 50 may further include a locking means for locking the piston at the bottom of its stroke. This locking means 120 includes two opposing tapered grooves 122, each having a plurality of balls 124 loosely positioned therein, as shown in FIGS. 3, 4a and 4b. With the piston in its pre-stroked position (shown in FIGS. 1 and 4a), the balls are located at the upper or wider portion 126 of the groove 122, as shown in FIG. 4a. After the piston 50 has moved downward (as shown in FIG. 5), removing slack about the occupant, the balls 124 remain in the upper portion 126 of the respective grooves 122. During an accident the occupant will tend to move forward, loading the seat belt and cable 90, which will tend to pull the piston 50 up through the bore 26. A slight upward motion of the piston 50 forces the plurality of balls into a locking relationship between the piston and housing 22, preventing the piston from moving as shown in FIG. 4b.

Upon activation of the pyrotechnic device 80, gasses are produced which are communicated to the gas chamber 72. These gasses act upon an upper surface 51 of the piston 50 urging the piston downwardly. As mentioned above, end 94 of the cable 92 is fixedly secured to the housing 22. As the piston 50 is moved downwardly, the cable 92 slides within the groove 58 (pulley 60) and bore 54b drawing the buckle 90 downwardly (see arrow 130). FIG. 5 shows the piston in its downward position with the buckle 90 moved closer to the housing 22. As can be appreciated, the configuration of the cable 92 and piston 50 provides the pretensioner 20 with a mechanical advantage of two, that is, for each unit of movement of the piston 50 within the housing 22, the buckle 90 moves two units closer to the housing. As can be appreciated, the present invention provides a compactly sized pretensioner with the ability of providing an increased buckle pretensioning motion to eliminate the slack about the occupant. Reference is again briefly made to FIG. 1. After the piston 50 reaches the end of its stroke, the movement of the buckle 90 toward the floor or seat will remove slack in the lap and shoulder belt portions of a seat belt, tightening the belt about the occupant. While not illustrated, a tongue is received in and locked to the buckle in a known manner. The tongue is attached to the seat belt. A typical tongue will include a slot therein through which a seat belt is received. Part of the seat belt will extend across the lap of the occupant (forming a lap belt portion) and another part will extend upwardly forming the shoulder belt portion of the seat belt.

Figure 6:
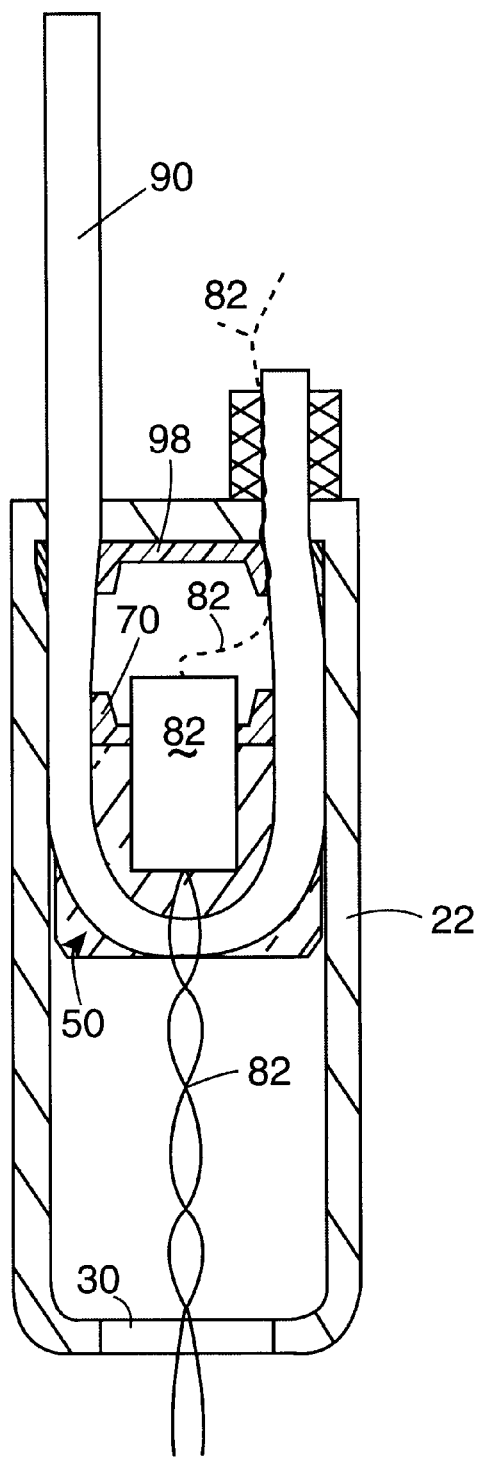
FIG. 6 shows an alternate embodiment of the invention.

Reference is briefly made to FIG. 6 which shows an alternate embodiment of the invention. In this embodiment of the invention, the pyrotechnic device 80 is attached to the piston 50. The lead wire or wires 82 are passed through the piston 50 and opening 30 (or alternatively though the seal 98 and opening 34). The operation of this device is virtually identical to that shown in FIG. 1. Upon activation of the pyrotechnic device 80, products of combustion are produced and communicated to the gas chamber 72. Thereafter, the piston 50 is urged downwardly causing the pretensioning motion of the buckle 90. The piston 50 is locked in place by a locking device 120.

Figure 7:
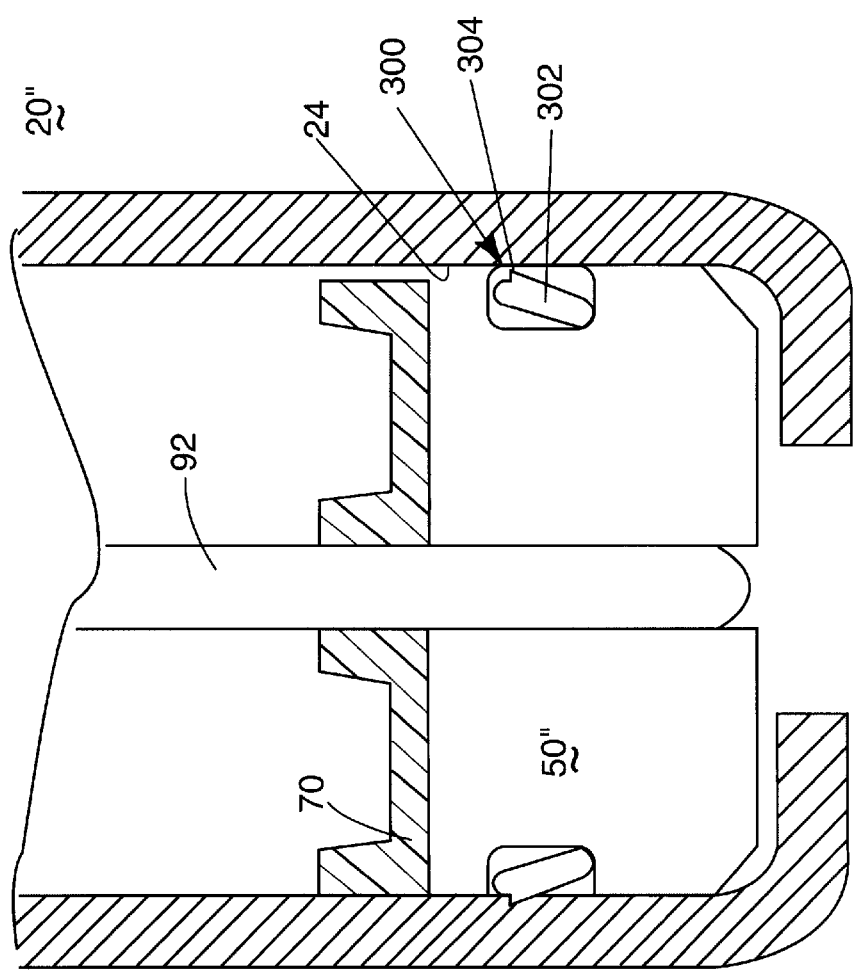
FIG. 7 shows an energy absorbing mechanism incorporated into the piston.

FIG. 7 shows a further embodiment of the pretensioner 20". The locking means 120 described above, when activated, prevents upward motion of the piston 50 and locks the occupant in place. In certain situations, during an accident, after the slack has been removed by the operation of the pretensioner 20, it is desirable to permit the occupant to be able to move forward in a controlled manner as opposed to being fixed in place. The controlled movement of the occupant can be realized by a modification of the piston 50'. In the embodiment as shown in FIG. 7, the locking means 120 has been replaced by an energy absorbing mechanism 300 comprising a plurality of wedges 302 having sharp, metal cutting or swedging edges 304. After the piston 50" has been pushed to the bottom of its stroke by the operation of the pyrotechnic device 80 the occupant will load the seat belt and piston 50" as momentum is transferred to the occupant during the accident. The upward motion of piston 50" urges the cutting or swedging edges 204 into the walls 24 of the housing 22.

As the piston 50" is pulled upwardly, by the occupant load, the edges 204 extrude or cut metal from the walls dissipating crash energy, and additionally, this metal cutting or sweding generates a reaction force upon the cable 92, buckle 90 and seat belt to controllably restrict the forward motion of the occupant.

Figure 8:
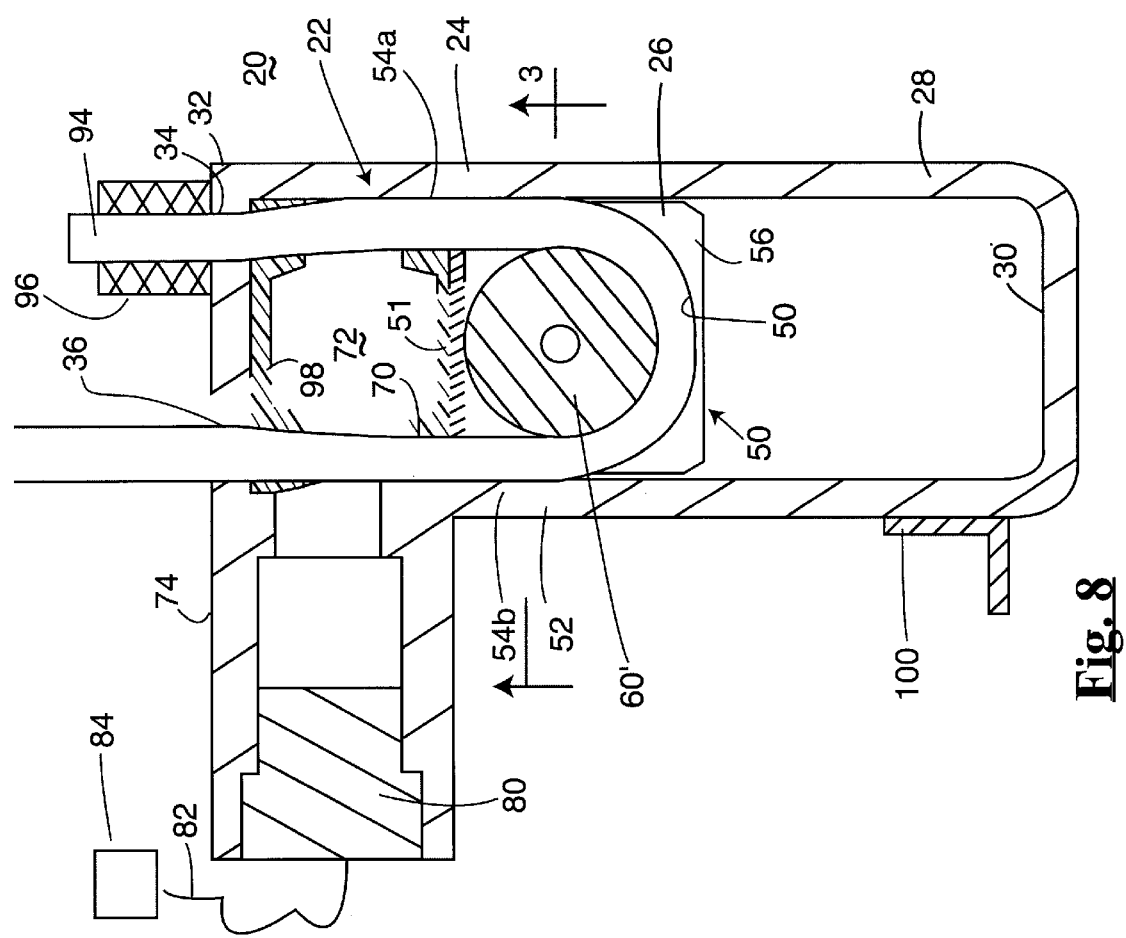
FIGS. 8 and 9 show a further alternate of the present invention.
Figure 9:
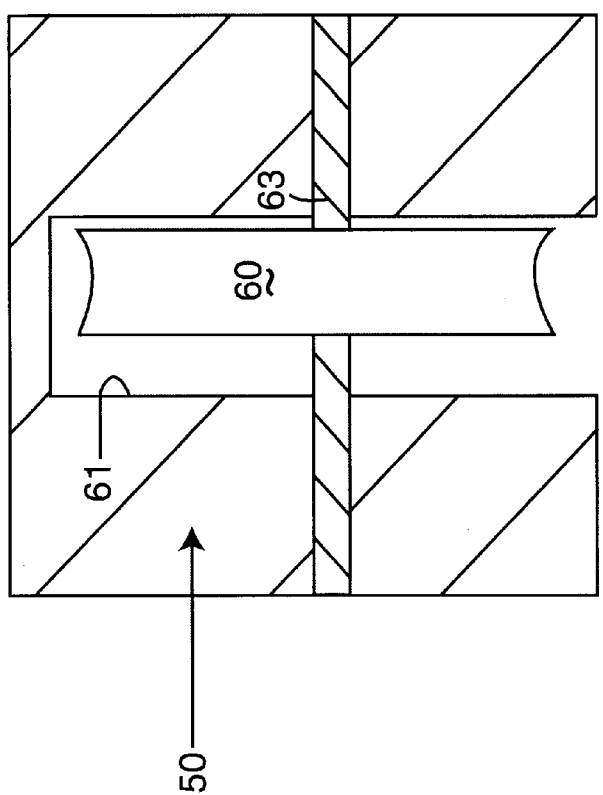

Reference is briefly made to the pretensioner 20 of FIGS. 8 and 9. In this embodiment of the invention the pulley surface 58 formed as a groove in the piston 50 is replaced by a pulley wheel 60' located within a groove 61 of the piston 50. The pulley or pulley wheel 60' is rotationally supported relative to the piston 50 by a pin or shaft 63. As can be appreciated as the piston is driven downwardly carrying the flexible link such as the cable 92, the pulley 60' rotates thus reducing sliding friction which might exist between the fixed groove 58 and the cable 92.

Figure 10:
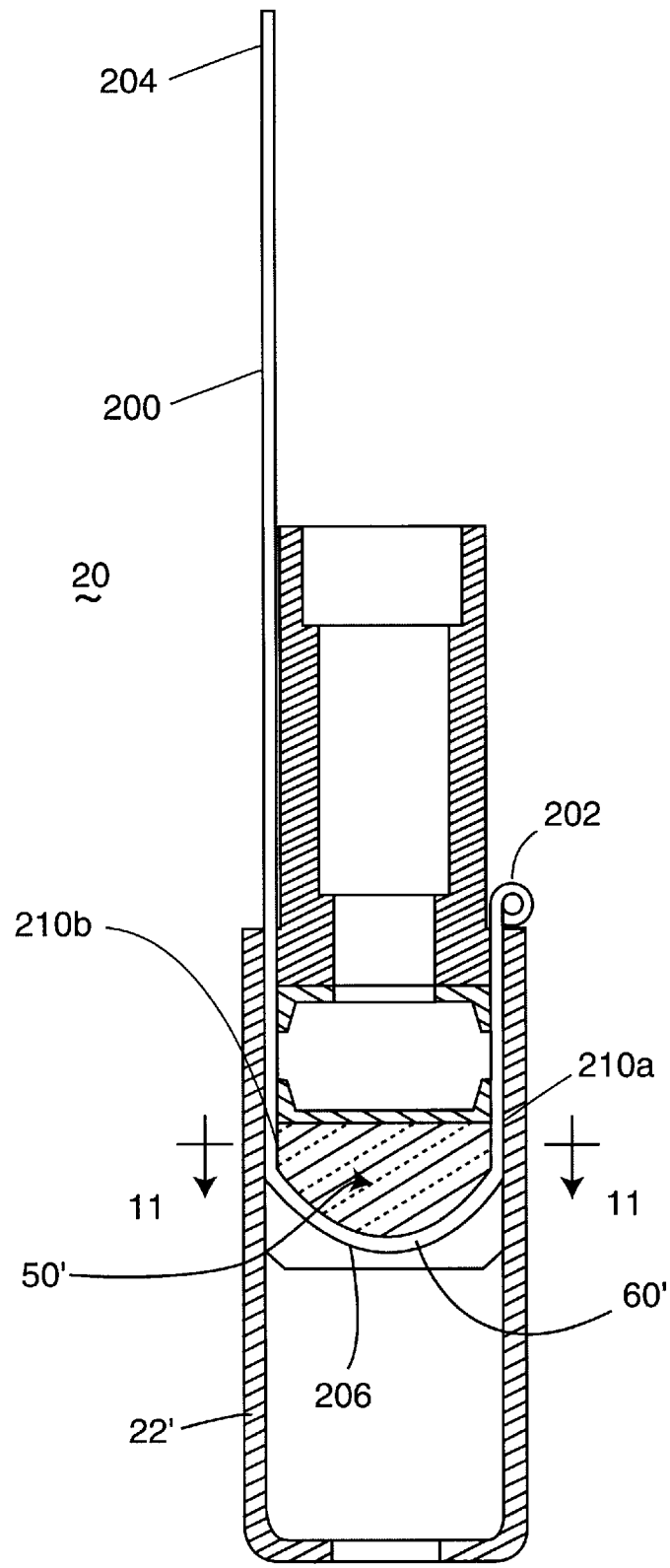
FIGS. 10 and 11 show an added embodiment of the invention.
Figure 11:
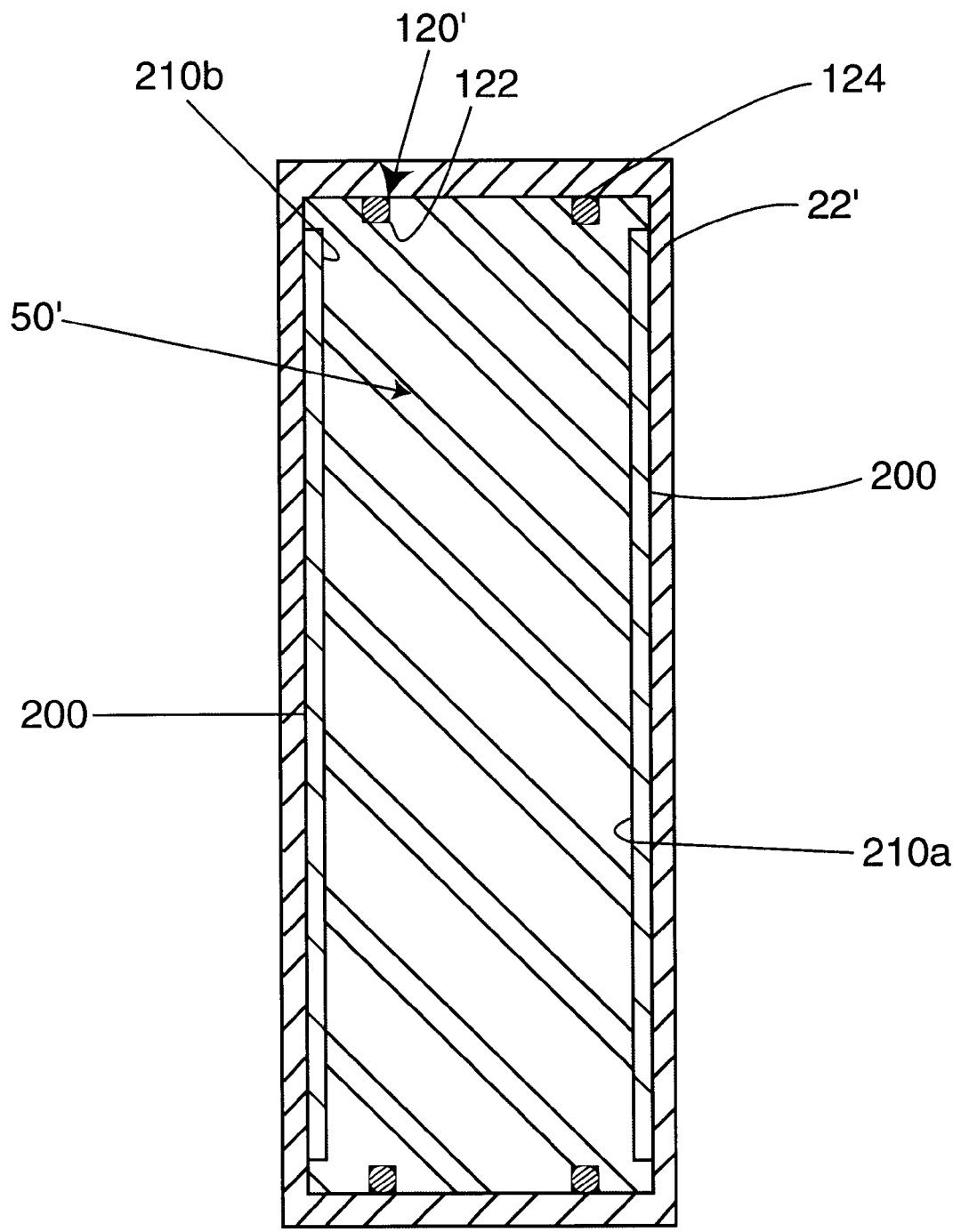

Reference is briefly made to FIGS. 10 and 11 which illustrate a further embodiment of the invention. The housing 22' is generally oblong or rectangular in cross section to accommodate a rectangular shaped piston 50'. The pulley or pulley surface 60' of the piston 50' is substantially wider than the pulley 60 of the embodiment illustrated in FIGS. 1 and 2. In this embodiment of the invention, the Bowden cable 92 is replaced by a length of seat belt material 200 having a first end 202 secured to the housing 22' such as by a folded-over, sewn loop of webbing, and a second end 204 secured to the buckle 90. A medial section 206 of the seat belt 200 is slidably received about the pulley section 60' of the piston 50'. The piston 50' and/or housing 22' are constructed to cooperatively define opposing rectangular grooves 210a and 210b on either side of the piston 50'. As can be appreciated, these grooves are similar in function to the grooves or bores 54a and 54b in FIG. 1. The piston 50' further includes the locking means 120' which may comprise a plurality of tapered grooves 122 having an individual ball 124 therein.

Many changes and modifications in the above described embodiment of the invention can, of course, be carried out without departing from the scope thereof. Accordingly, that scope is intended to be limited only by the scope of the appended claims.

We claim:

1. A pretensioner (20) comprising:
a housing (22) with a bore (26);
a piston (50) slidably received within the bore (26), the piston further including an arcuate contact surface (58, 60) at one end thereof;
a flexible link (92) having a first end (94) fixedly connected to the housing (22), a medial portion positioned about the contact surface and an opposite end (93) operatively connected to a movable buckle (90);
first means (80) for propelling the piston from a first, static position to a second position to affect a mechanical advantage in the movement of the buckle (90).

2. The pretensioner as defined in claim 1 further including locking means (120) to secure the piston at its second position.

3. The combination as defined in claim 1 including energy absorbing means (200) for permitting the piston (50") to move in an opposite direction in a controlled manner in response to occupant loads transmitted to the flexible link.

4. The pretensioner as defined in claim 1 wherein the contact surface is part of a rotationally supported pulley (60').

5. The pretensioner as defined in claim 1 including energy absorbing means (200) for permitting the piston to move from the second position toward the first position in a controlled manner in response to forces input to the link.

6. The pretensioner as defined in claim 1 wherein the first means is located remotely from the piston.

7. The pretensioner as defined in claim 1 wherein the first means is located on the piston.

8. The pretensioner as defined in claim 1 wherein the contact surface does not move relative to another portion of the piston.

9. The pretensioner as defined in claim 1 wherein the flexible link (92) is a length of flexible, seat belt material.

10. The pretensioner as defined in claim 9 wherein the contact surface is substantially as wide as the seat belt material.

11. The pretensioner as defined in claim 1 wherein the flexible link (92) is a cable.

12. The pretensioner as defined in claim 11 wherein the contact surface includes an arcuate groove to receive the cable.

13. The pretensioner as defined in claim 12 wherein the arcuate groove is part of a rotatable pulley within the piston.

14. A combination comprising a pretensioner (22) and a seat belt buckle (90), the pretensioner comprising:
a housing (20) with a bore (26);
a flexible link (90), the flexible link operatively connecting the buckle and the housing;
a piston (50) slidably received within the bore (26), the piston including first means (60) cooperating with the flexible link for moving the buckle (90) a distance greater than the movement of the piston.
second means (80) for propelling the piston, in a direction, from a first, static position to a second position to affect the movement of the buckle (90).

15. The combination as defined in claim 14 wherein the first means includes an arcuate contact surface (58, 60) at one end of the piston; and wherein the flexible link (92) includes a first end (94) fixedly connected to the housing (22), a medial portion positioned about the contact surface and an opposite end (93) operatively connected to the buckle (90).

16. The combination as defined in claim 15 wherein the contact surface is part of a rotationally supported pulley (60').

17. The combination as defined in claim 15 wherein the contact surface does not move relative to another portion of the piston.

18. A pretensioner comprising:

a housing with a bore;

a piston (50) slidably received within the bore, the piston further including an arcuate contact surface at one end thereof;

a flexible link having a first end fixedly connected to the housing, a medial portion positioned about the contact surface and an opposite end operatively connected to a safety restraint device;

first means for propelling the piston from a first, static position to a second position to affect a mechanical advantage in the movement of the safety restraint device.

* * * * *